(12) United States Patent
Whiteford et al.

(10) Patent No.: US 7,662,313 B2
(45) Date of Patent: Feb. 16, 2010

(54) ORIENTED NANOSTRUCTURES AND METHODS OF PREPARING

(75) Inventors: Jeffery A. Whiteford, Belmont, CA (US); Mihai Buretea, San Francisco, CA (US); Erik Scher, San Francisco, CA (US); Steve Empedocles, Mountain View, CA (US); Andreas Meisel, San Francisco, CA (US)

(73) Assignee: NANOSYS, Inc., Palo Alto, CA (US)

( * ) Notice: Subject to any disclaimer, the term of this patent is extended or adjusted under 35 U.S.C. 154(b) by 371 days.

(21) Appl. No.: 10/656,911

(22) Filed: Sep. 4, 2003

(65) Prior Publication Data

US 2004/0146560 A1 Jul. 29, 2004

Related U.S. Application Data

(60) Provisional application No. 60/408,722, filed on Sep. 5, 2002, provisional application No. 60/421,353, filed on Oct. 25, 2002, provisional application No. 60/452,038, filed on Mar. 4, 2003, provisional application No. 60/452,232, filed on Mar. 4, 2003.

(51) Int. Cl.
*H01B 1/00* (2006.01)
*C07D 333/50* (2006.01)
*C07F 9/22* (2006.01)

(52) U.S. Cl. .......................... 252/500; 549/41; 549/42; 562/8; 562/23

(58) Field of Classification Search ................ 257/746, 257/741; 423/701, 702, 713; 428/292.1; 977/810, 811, 812, 813, 814, 815, 816, 817, 977/818, 819, 824, 825, 826, 827; 252/500; 424/484; 549/41, 42; 562/8, 23
See application file for complete search history.

(56) References Cited

U.S. PATENT DOCUMENTS

| | | | |
|---|---|---|---|
| 5,196,396 A | 3/1993 | Lieber | |
| 5,230,957 A | 7/1993 | Lin | |
| 5,252,835 A | 10/1993 | Lieber et al. | |
| 5,274,602 A | 12/1993 | Glenn | |
| 5,505,928 A | 4/1996 | Alivisatos et al. | |
| 5,537,000 A | 7/1996 | Alivisatos et al. | |
| 5,640,343 A | 6/1997 | Gallagher et al. | |
| 5,690,807 A | 11/1997 | Clark, Jr. et al. | |
| 5,751,018 A | 5/1998 | Alivisatos et al. | |
| 5,849,215 A * | 12/1998 | Gin et al. ............... | 252/299.01 |

(Continued)

FOREIGN PATENT DOCUMENTS

WO     WO 96/29629 A2     9/1996

(Continued)

OTHER PUBLICATIONS

Bachtold et al. (2001) "Logic Circuits with Carbon Nanotube Transistors." *Science* 294:1317-1320.

(Continued)

*Primary Examiner*—D. Lawrence Tarazano
*Assistant Examiner*—Camie S Thompson
(74) *Attorney, Agent, or Firm*—Quine Intellectual Property Law Group; Gary Baker

(57) ABSTRACT

This invention provides compositions and devices having structurally ordered nanostructures, as well as methods for producing structurally ordered nanostructures.

22 Claims, 3 Drawing Sheets

U.S. PATENT DOCUMENTS

| | | | |
|---|---|---|---|
| 5,897,945 A | 4/1999 | Lieber et al. | |
| 5,958,367 A * | 9/1999 | Ying et al. | 423/701 |
| 5,990,479 A | 11/1999 | Weiss et al. | |
| 5,997,832 A | 12/1999 | Lieber et al. | |
| 6,036,774 A | 3/2000 | Lieber et al. | |
| 6,048,616 A | 4/2000 | Gallagher et al. | |
| 6,128,214 A | 10/2000 | Kuekes et al. | |
| 6,136,156 A | 10/2000 | El-Shall et al. | |
| 6,159,742 A | 12/2000 | Lieber et al. | |
| 6,190,634 B1 | 2/2001 | Lieber et al. | |
| 6,198,655 B1 | 3/2001 | Heath et al. | |
| 6,207,229 B1 | 3/2001 | Bawendi et al. | |
| 6,225,198 B1 | 5/2001 | Alivisatos et al. | |
| 6,228,248 B1 * | 5/2001 | Aksay et al. | 205/687 |
| 6,239,355 B1 | 5/2001 | Salafsky | |
| 6,306,736 B1 | 10/2001 | Alivisatos et al. | |
| 6,322,901 B1 | 11/2001 | Bawendi et al. | |
| 6,413,489 B1 | 7/2002 | Ying et al. | |
| 6,733,946 B2 | 5/2004 | Kumacheva et al. | |
| 6,762,237 B2 | 7/2004 | Glatkowski et al. | |
| 6,812,272 B2 | 11/2004 | Fischer | |
| 6,863,983 B2 * | 3/2005 | Tsapatsis et al. | 428/446 |
| 6,876,796 B2 | 4/2005 | Garito et al. | |
| 6,878,871 B2 * | 4/2005 | Scher et al. | 136/252 |
| 6,882,051 B2 * | 4/2005 | Majumdar et al. | 257/746 |
| 6,946,109 B2 * | 9/2005 | Pinnavaia et al. | 423/335 |
| 7,056,455 B2 * | 6/2006 | Matyjaszewski et al. | 264/29.2 |
| 7,087,833 B2 * | 8/2006 | Scher et al. | 136/252 |
| 7,211,464 B2 * | 5/2007 | Lieber et al. | 438/99 |
| 2003/0142944 A1 | 7/2003 | Sundar et al. | |

FOREIGN PATENT DOCUMENTS

| | | |
|---|---|---|
| WO | WO 01/03208 A1 | 1/2001 |
| WO | WO 02/17362 A2 | 2/2002 |
| WO | WO 02/48701 A2 | 6/2002 |
| WO | WO 02/080280 A1 | 10/2002 |
| WO | WO 03/005450 A2 | 1/2003 |
| WO | WO 03/009827 A1 | 2/2003 |
| WO | WO 03/009991 A1 | 2/2003 |
| WO | WO 03/027847 A1 | 4/2003 |
| WO | WO 03/085700 A2 | 10/2003 |
| WO | WO 03/085701 A2 | 10/2003 |
| WO | WO 2004/022637 A2 | 3/2004 |
| WO | WO 2004/022714 A2 | 3/2004 |
| WO | WO 2004/023527 A2 | 3/2004 |

OTHER PUBLICATIONS

Bjork et al. (2002) "One-dimensional Steeplechase for Electrons Realized" *Nano Letters* 2(2):86-89.

Cao et al. (2000) "Growth and properties of semiconductor core/shell nanocrystals with InAs cores" *Journal of the American Chemistry Society* 122:9692-9702.

Caulder et al. (2001) "Design, Formation and Properties of Tetrahedral $M_4L_4$ and $M_4L_6$ Supramolecular Clusters." *Journal of the American Chemistry Society* 123:8923-8938.

Chen et al. (1999) "Observation of a Large On-Off Ratio and Negative Differential Resistance in an Electronic Molecular Switch" *Science* 286:1550-1552.

Chung et al. (2000) "Si Nanowire Devices" *Applied Physics Letters* 76(15):2068-2070.

Collier et al. (1999) "Electronically Configurable Molecular-Based Logic Gates." *Science* 285:391-394.

Colvin et al. (1992) "Semiconductor Nanocrystals Covalently Bound to Matal Surfaces with Self-Assembled Monolayers." *Journal of the American Chemistry Society* 114:5221-5230.

Cui et al. (2000) "Doping and electrical transport in silicon nanowires" *Journal of Physical Chemistry B* 104(22): 5213-5216.

Cui et al. (2001) "Diameter-controlled synthesis of single-crystal silicon nanowires." *Applied Physics Letters* 78(15): 2214-2216.

Dabbousi et al. (1997) "(CdSe)ZnS core-shell quantum dots: Synthesis and characterization of a size series of highly luminescent nanocrystallites." *Journal of Physical Chemistry B* 101:9463-9475.

Derycke et al. (2001) "Carbon Nanotube Inter- and Intramolecular Logic Gates." *Nano Letters* 1(9): 453-456.

Duan et al. (2000) "General synthesis of compound semiconductor nanowires" *Advanced Materials* 12:298-302.

Greenham et al. (1996) "Charge separation and transport in conjugated-polymer/semiconductor-nanocrystal composites studied by photoluminescence quenching and photoconductivity." *Physical Review B-Condens Matter* 54(24): 17628-17637.

Gudiksen et al. (2000) Diameter-selective synthesis of semiconductor nanowires *Journal of the American Chemistry Society*. 122:8801-8802.

Gudiksen et al. (2001) "Synthetic control of the diameter and length of single crystal semiconductor nanowires" *Journal of Physical Chemistry B* 105:4062-4064.

Gudiksen et al. (2002) "Growth of nanowire superlattice structures for nanoscale photonics and electronics." *Nature* 415:617-620.

Huang et al. (2001) "Logic Gates and Computation from Assembled Nanowire Building Blocks." *Science* 294:1313-1317.

Huang et al. (2003) "From ID chain to 3D network: Tuning hybrid II-VI nanostructures and their optical properties." *Journal of the American Chemistry Society* 125:7049-7055.

Huang et al. (2001) "Directed Assembly of One-Dimensional Nanostructures Into Functional Networks" *Science* 291:630-633.

Huynh et al. (2002) "Hybrid Nanorod-Polymer Solar Cells." *Science* 295:2426-2427.

Huynh et al. (1999) "CdSe Nanocrystals Rod/Poly (30hexylthiophene) Composite Photovoltaic Devices." *Advanced Materials* 11(11): 923-927.

Jun et al. (2001) "Controlled synthesis of multi-armed CdS nanorod architectures using monosurfactant system." *Journal of the American Chemistry Society* 123:5150-5151.

Kong et al. (1998) "Synthesis of Individual Single-Walled Carbon Nanotubes on Patterned Silicon Wafers." *Nature* 395: 878-881.

Kong et al (1998), "Chemical Vapor Deposition of Methane for Single-Walled Carbon Nanotubes" *Chemical Physics Letters* 292:567-574.

Leininger et al. (2000) "Self-Assembly of Discrete Nanostructures Mediated by Transition Metals." *Chem. Rev.* 100:853-908.

Liu et al. (2001) "Sol-Gel Synthesis of Free-Standing Ferroelectric Lead Zirconate Titanate Nanoparticles." *Journal of the American Chemistry Society* 123:4344-4345.

Manna et al. (2000) "Synthesis of Soluble and Processable Rod-, Arrow-, Teardrop-, and Tetrapod-Shaped CdSe Nanocrystals." *Journal of the American Chemistry Society* 122:12700-12706.

Manna et al. (2002) "Epitaxial growth and photochemical annealing of graded CdS/ZnS shells on colloidal CdSe nanorods" *Journal of the American Chemistry Society* 124:7136-7145.

Morales et al. (1998) "A laser ablation method for the synthesis of crystalline semiconductor nanowires." *Science* 279:208-211.

Peng et al. (1997) "Epitaxial growth of highly luminescent CdSe/CdS core/shell nanocrystals with photostability and electronic accessibility." *Journal of the American Chemistry Society* 119:7019-7029.

Peng et al. (2000) "Shape control of CdSe nanocrystals." *Nature* 404:59-61.

Puntes et al. (2001) "Colloidal nanocrystal shape and size control: The case of cobalt." *Science* 291:2115-2117.

Schenning et al. (2002) "Supramolecular Organization of α,α'-Distributed Sexithiophenes." *Journal of the American Chemistry Society* 124:1269-1275.

Schön et al. (2001) "Field-Effect Modulation of the Conductance of Single Molecules." *Science* 294:2138-2140.

Schön et al. (2001) "Self-assembled monolayer organic field-effect transistors." *Nature* 413:713-716.

Service (2001), "Assembling Nanocircuits From the Bottom Up." *Science* 293: 782-785.

Shimazaki et al. (1998) "Preparation and Characterization of the Layer-by-Layer Deposited Ultrathin Film Based on the Charge-Transfer Interaction in Organic Solvents." *Langmuir* 14:2768-2773.

Stockton and Rubner (1997) "Molecular-Level Processing of Conjugated Polymers. 4. Layer-By-Layer Manipulation of Polyaniline via Hydrogen-Bonding Interactions." *Macromolecules* 30:2717-2725.

Su and Mrksich (2002) "Using Mass Spectrometry to Characterize Self-Assembled Monolayers Presenting Peptides, Proteins, and Carbohydrates." *Angew. Chem. Int Ed.* 41(24): 4715-4718.

Thess et al. (1996) "Crystalline Ropes of Metallic Carbon Nanotubes." *Science* 273: 483-487.

Tseng and Ellenbogen (2001) "Toward Nanocomputers." *Science* 294: 1293-1294.

Urban et al. (2002) "Synthesis of single-crystalline perovskite nanorods composed of barium titanate and strontium titanate." *Journal of the American Chemistry Society* 124(7): 1186-1187.

Wu et al. (2002) "Block-by-block growth of single-crystalline Si/SiGe superlattice nanowires." *Nano Letters* 2(2): 83-86.

Yun et al. (2002) "Ferroelectric Properties of Individual Barium Titanate Nanowires Investigated by Scanned Probe Microscopy." *Nano Letters* 2(5): 447-450.

Zhou et al. (1997) "Nanoscale Metal/Self-Assembled Monolayer/Metal Heterostructures." *Applied Physics Letters* 71:611-613.

\* cited by examiner

ORIENTED NANOSTRUCTURES AND METHODS OF PREPARING

CROSS-REFERENCE TO RELATED APPLICATIONS

This application is related to U.S. provisional applications U.S. Ser. No. 60/408,722, filed Sep. 5, 2002; U.S. Ser. No. 60/421,353, filed Oct. 25, 2002; U.S. Ser. No. 60/452,038, filed Mar. 4, 2003; and U.S. Ser. No. 60/452,232, filed Mar. 4, 2003. The present application claims priority to and benefit of each of these prior applications, which are hereby incorporated herein by reference in their entirety for all purposes.

FIELD OF THE INVENTION

The present invention is in the field of nanotechnology. More particularly, the present invention is directed to structurally ordered nanostructure compositions (e.g., non-randomly oriented and/or arranged nanostructures), as well as related methods for producing, and related devices.

BACKGROUND OF THE INVENTION

Nanostructures such as nanotubes, nanocrystals, and nanowires have gained a great deal of attention for their interesting and novel properties in electrical, chemical, optical and other applications. Such nanomaterials have a wide variety of expected and actual uses, including use as semiconductors for nanoscale electronics, optoelectronic applications in emissive devices (e.g., lasers, LEDs, etc.), light collectors, photovoltaics, and sensor applications (see, for example international applications PCT/US03/09827 filed Mar. 1, 2003, PCT/US03/09991 filed Mar. 1, 2003 and PCT/US03/27846 and co-filed herewith; PCT publication WO 03/005450; and U.S. Pat. No. 5,230,957; U.S. Pat. No. 5,537,000; U.S. Pat. No. 5,990,479; U.S. Pat. No. 6,198,655; and U.S. Pat. No. 6,207,229).

While commercial applications of the molecular, physical, chemical and optical properties of these materials have been postulated, generating commercially viable products has not, as yet, been forthcoming. In the world of devices with integrated nanostructure elements, some of the difficulties in producing commercially viable products has stemmed from the difficulty in handling and interfacing with such small scale materials. For example, existing nanocrystal-based photovoltaic device technologies suffer from inefficient charge transfer from the nanostructure surface to the electrode of the photovoltaic device. One limiting factor in the electron/hole transport is the degree of nanocrystal packing and ordering. For the most part, the nanostructures are produced in bulk as free-standing elements that must be positioned and/or oriented within the photovoltaic device, a task which has proven difficult. While a variety of procedures for making nanostructures are available, current technologies are insufficient to produce selectively-oriented or arranged arrays of nanostructures.

Accordingly, there exists a need in the art for non-randomly oriented nanostructures and/or non-randomly-arranged nanostructures, as well as methods for preparing non-randomly oriented or non-randomly dispersed nanostructures, for example, within a matrix. The present invention meets these and a variety of other needs. A complete understanding of the invention will be obtained upon review of the following.

SUMMARY OF THE INVENTION

The present invention provides compositions of structurally ordered nanostructures, as well as methods for preparing structurally ordered nanostructures. Any of a number of nanostructures (or combination of nanostructures) can be used in the compositions and methods of the present invention, including, but not limited to, nanocrystals, nanospheres, nanorods, nanowires, nanoribbons, nanotetrapods, various branched structures (e.g., dendrimer branching structures), quantum dots, nanodots, and the like.

In one aspect, the present invention provides a plurality of structurally ordered nanostructures in a matrix. In one embodiment, the structurally ordered nanostructures are substantially non-randomly oriented nanostructures. Optionally, the non-randomly oriented nanostructures are substantially aligned with respect to one another, and/or substantially aligned with a selected axis. For compositions that are associated with or otherwise proximal to a substrate, the axis can be selected to be oriented substantially perpendicular to the surface of the substrate, parallel to the surface, or at a desired angle with respect to the surface.

In another aspect of the present invention, the plurality of structurally ordered nanostructures provide a substantially regularly-ordered array of nanostructures. Alternatively, the structurally ordered nanostructures are provided as an irregularly-ordered arrangement of structurally ordered nanostructures.

Nanostructures for use in the compositions of the present invention are available in a variety of available shapes, such as spherical, ovoid, elongated or branched structures. For example, the structurally ordered nanostructures can be nanocrystals, nanodots, nanospheres, nanorods, nanowires, nanotetrapods, dendrimer branching structures, or any combination thereof. Preferably, the nanostructures are inorganic nanostructures, such as conductive nanostructures or semiconductive nanostructures.

Optionally, the matrix used in the compositions of the present invention have one or more components that interact to form a plurality of receiving structures that provide an ordering and/or an orientation to the nanostructures. In some embodiments, self-organizing molecules, such as those used to prepare self assembling monolayers, are used as components of the matrix. Furthermore, in some embodiments, one or more components of the matrix can be chemically crosslinked to one another or polymerized (e.g., during or after formation of the nanostructure-containing matrix).

Optionally, one or more components of the matrix can also be crosslinked to one or more of the nanostructures, or to a surface ligand associated with the nanostructures (e.g., an intervening component, such as a surfactant). In some embodiments, the matrix components provide multiple functionalities for binding to the nanostructure(s).

In some embodiments of the present invention, two or more matrix layers are present in the nanostructure-containing composition. Preferably, each member layer contains a plurality of structurally ordered nanostructures. The member nanostructures in a first matrix layer may or may not aligned with respect to the member nanostructures in the adjacent matrix layer.

In a further aspect, the present invention provides compositions having a plurality of structurally ordered nanostructures, wherein members nanostructures comprise one or more alignment ligands associated with the nanostructures. The structurally ordered nanostructures are typically substantially non-randomly oriented nanostructures. Optionally, the structurally ordered nanostructures are substantially aligned nanostructures.

The structurally ordering of the plurality of nanostructures is achieved by interacting a first alignment ligand on a first member nanostructure with a second alignment ligand on an adjacent member nanostructure. Typically, the first and second alignment ligands are complementary binding pairs. Optionally, both complements of the binding pair are provided on the same molecule (e.g., a multifunctional molecule). In some embodiments, a single chemical entity can be used as the first and second alignment ligands. Alternatively, the two halves of the complementary binding pair can be provided on different compositions, such that the first and second alignment ligands are differing molecules.

In a preferred embodiment, the first and second alignment ligands are self-organizing molecules. For example, alignment ligands can be generated using self assembling monolayer components.

Typically, the complementary binding pairs employed in the alignment ligands are molecules having a molecular recognition functionality. For example, the alignment ligands can include an amine-containing compound and a ketone or alcohol-containing compound. Alternatively, one or more biomolecule pairs can be used as the alignment ligands. Exemplary biomolecule pairs include, but are not limited to, an antibody and an antigen that binds to the antibody; biotin and avidin (or streptavidin); a lectin and a carbohydrate ligand; complementary nucleic acids; a protein and a ligand; a receptor and a ligand; an aptamer and an aptamer ligand. Furthermore, combinations of biomolecules can be employed. In one embodiment, the first alignment ligand and/or the second alignment ligand comprise two or more selected molecular recognition functionalities per alignment ligand.

The alignment ligands can be associated (either directly or indirectly) with any of a number of nanostructure shapes and sizes, such as spherical, ovoid, elongated or branched structures. For example, nanostructures can be nanocrystals, nanospheres, nanorods, nanowires, nanotetrapods, dendrimer branching structures, or any combination thereof. Preferably, the nanostructures are inorganic nanostructures, such as conductive nanostructures or semiconductive nanostructures. The alignment ligand can either be directly associated with the surface of a nanostructure, or indirectly associated, through a surface ligand on the nanostructure; this interaction can be, for example, an ionic interaction, a covalent interaction, a hydrogen bond interaction, an electrostatic interaction, a coulombic interaction, a van der Waals force interaction, or a combination thereof. Optionally, the chemical composition of the first and/or second alignment ligands includes one or more functionalized head group capable of binding to a nanostructure surface, or to an intervening surface ligand. Chemical functionalities that can be used as a functionalized head group in the present invention include, but are not limited to, one or more phosphonic acid, carboxylic acid, amine, phosphine, phosphine oxide, carbamate, urea, pyridine, isocyanate, amide, nitro, pyrimidine, imidazole, salen, dithiolene, catechol, N,O-chelate ligand (such as ethanol amine or aniline phosphinate), P,N-chelate ligand, and/or thiol moieties.

In a further aspect, the present invention provides a plurality of clusters of structurally ordered nanostructures (for example, substantially aligned nanostructures) on a substrate. The nanostructures can be positioned, e.g., substantially perpendicular to the plane of the substrate, substantially parallel to the substrate, or at another selected angle. Furthermore, the substrate can be planar, curved, or can comprise more complex two or three dimensional geometries. Optionally, the position or orientation of the nanostructure is selected such that clusters of nanostructures are tuned; this can be achieved, e.g., by selecting an appropriate atom geometry and/or chemical composition (see, for example, Huang et al. (2003) "From 1D chain to 3D network: Tuning hybrid II-VI nanostructures and their optical properties" *J. Am. Chem. Soc.* 125:7049-7055). Optionally, the atom geometry is tetrahedral, square, planar, octahedral, or another selected configuration.

The present invention also provides methods for preparing aligned, oriented, arranged, or otherwise structurally ordered nanostructures. In some embodiments of the methods of the present invention, a plurality of non-randomly oriented or non-randomly dispersed nanostructures in a matrix are prepared by a) providing a plurality of nanostructures and a matrix composition, in which the matrix composition includes one or more matrix components that interact to form a plurality of receiving structures capable of accommodating the nanostructures; and b) heating and cooling the matrix composition in the presence of the plurality of nanostructures, thereby preparing the plurality of non-randomly oriented or non-randomly dispersed nanostructures in the matrix.

In one embodiment, the matrix composition is provided as one or more matrix components or monomers in a non-ordered (e.g., unassembled) form; the process of heating and cooling the matrix composition in the presence of the plurality of nanostructures allows for thermodynamic ordering of the matrix around the plurality of nanostructures, thereby preparing an ordered nanostructure-containing matrix.

In an alternate embodiment, the matrix composition is provided as a pre-formed matrix having the plurality of receiving structures capable of accommodating the nanostructures. Heating and cooling the matrix composition in the presence of the plurality of nanostructures provides the energy necessary to insert the nanostructures into the receiving structures of the matrix.

In another embodiment of the present invention, methods for preparing a plurality of selectively-oriented nanostructures are provided. The methods include the steps of: a) providing a plurality of nanostructures comprising a first set of nanostructures associated with a first alignment ligand and a second set of nanostructures associated with a second alignment ligand; and b) interacting the first alignment ligand on a first nanostructure with the second alignment ligand on a second adjacent nanostructure, to selectively orient the plurality of nanostructures. Optionally, the first and second alignment ligands are complementary binding pairs, which can be presented on separate molecules or on differing portions of the same molecule.

Preferably, the first and/or second alignment ligands are physically coupled (e.g., bonded) to the nanostructure surface (or to a molecule associated with the surface). Typically, this interaction is through a portion of the alignment ligand having a nanostructure binding moiety or functionalized head group of the present invention.

The nanostructures employed in the methods of the present invention (e.g., nanorods, nanowires, etc) can be prepared by any of a number of techniques, such as vapor deposition or solution phase deposition onto a substrate. The member nanostructures are then treated with the alignment ligands. For example, after preparing a plurality of nanostructures, the first alignment ligand is vapor phase deposited on a surface of a first portion of the plurality of nanostructures; and the second alignment ligand is vapor phase deposited on a surface of a second portion of the plurality of nanostructures. The nanostructure-alignment ligand conjugates are then allowed to interact, to drive the orientation of the nanostructures. If the nanostructures were synthesized on a substrate, the nanostructure-alignment ligand conjugates are optionally removed from the substrate.

Optionally, the first and second alignment ligands are complementary binding pairs selected for a particular molecular recognition functionality or moiety. The complementary binding pairs can provide a simple chemical interaction, such as the hydrogen bonding between an amine moiety and a ketone/alcohol moiety, or a more complex interaction, such as seen with biomolecule/bioconjugate pairs. A preferred set of molecular recognition functionalities are embodied in the class of compounds termed "self organizing molecules."

Interacting the first and second alignment ligands to achieve the selective orientation of the plurality of nanostructures, can be performed, for example, by heating and cooling the plurality of nanostructures. In embodiments in which the first and second alignment ligands further include a crosslinking or polymerizable element, interacting the alignment ligands optionally includes the step of crosslinking or polymerizing the first and second alignment ligands, e.g., to form a matrix.

As a further embodiment of the methods of the present invention, the plurality of selectively-oriented nanostructures can be affixed to a substrate or surface. Optionally, the first and second alignment ligands are removed after affixing the aligned nanostructures, to produce a plurality of selectively-oriented nanostructures on a substrate.

Any of a number of nanostructures known in the art can be used in the methods, including, but not limited to, nanocrystals, nanodots, nanospheres, nanorods, nanowires, nanotetrapods, various branching structures, or combinations thereof. The present invention also provides the plurality of selectively oriented, non-randomly oriented, or non-randomly dispersed nanostructures as prepared by the described methods.

The aligned and/or organized nanostructures can be used in any of a number of devices and applications, including, but not limited to, various photovoltaic devices, optoelectronic devices (LEDs, lasers, optical amplifiers), light collectors, photodetectors and/or the like.

DEFINITIONS

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a substrate" optionally includes a combinations of two or more substrates; reference to "nanowire" optionally includes mixtures of nanowires, and the like.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used in accordance with the definitions set out below.

As used herein, the term "nanostructures" refers to structures having at least one region or characteristic dimension with a dimension of less than 500 nm, e.g., less than 200 nm, less than 100 nm, less than 50 nm, or even less than 20 nm. Typically, the region or characteristic dimension will be along the smallest axis of the structure. Examples of such structures include various spherical, ovoid, elongated or branched structures, including, but not limited to, nanocrystals, nanowires, nanorods, nanotubes, branched nanowires, nanotetrapods, nanotripods, nanobipods, nanodots, quantum dots, nanoparticles, nanoribbons, and/or the like. Nanostructures can be substantially homogeneous in material properties, or in certain embodiments can be heterogeneous (e.g. heterostructures). Optionally, a nanostructure can comprise one or more surface ligands (for example, surfactants). The nanostructure is optionally substantially single crystal in structure (a "single crystal nanostructure" or a "monocrystalline nanostructure"). While nanostructures for use in the present invention can be fabricated from essentially any convenient material or material, preferably the nanostructure is prepared from an inorganic compound, a conductive material, and/or a semiconductive material. A conductive or semi-conductive nanostructure often displays 1-dimensional quantum confinement, e.g., an electron can often travel along only one dimension of the structure.

The terms "crystalline" or "substantially crystalline", when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. Nanocrystals typically have an aspect ratio between about 0.1 and about 1.5 (e.g., between about 0.1 and about 0.5, between about 0.5 and about 1, or between about 1 and about 1.5). Thus, nanocrystals include, for example, substantially spherical nanocrystals with aspect ratios between about 0.8 and about 1.2 and disk-shaped nanocrystals. Nanocrystals typically have a diameter between about 1.5 nm and about 15 nm (e.g., between about 2 nm and about 5 nm, between about 5 nm and about 10 nm, or between about 10 nm and about 15 nm). Nanocrystals can be substantially homogeneous in material properties, or in certain embodiments can be heterogeneous (e.g. heterostructures). The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is substantially monocrystalline, but the shell(s) need not be. The nanocrystals can be fabricated from essentially any convenient material or materials. The nanocrystals can comprise "pure" materials, substantially pure materials, doped materials and the like, and can include insulators, conductors, and semiconductors.

A "nanowire" is a nanostructure that has one principle axis that is longer than the other two principle axes. Consequently, the nanowire has an aspect ratio greater than one; nanowires of this invention have an aspect ratio greater than about 1.5 or greater than about 2. Short nanowires, sometimes referred to as "nanorods," typically have an aspect ratio between about 1.5 and about 10 (e.g., greater than 1.5, or greater than 5). Longer nanowires have an aspect ratio greater than about 10, greater than about 20, greater than about 50, or greater than about 100, or even greater than about 10,000. The diameter of a nanowire is typically less than about 500 nm, preferably less than about 200 nm, more preferably less than about 150 nm, and most preferably less than about 100 nm, about 50 nm, or about 25 nm, or even less than about 10 nm or about 5 nm. The length of a nanowire is optionally greater than about 100 nm, e.g., greater than 200 nm, greater than 500 nm, or even greater than 1000 nm.

The nanowires employed in the present invention can be substantially homogeneous in material properties, or in certain embodiments can be heterogeneous (e.g. nanowire heterostructures). The nanowires can be fabricated from essentially any convenient material or materials, and can be, e.g., substantially crystalline, substantially monocrystalline, polycrystalline, or amorphous. The nanowires can comprise "pure" materials, substantially pure materials, doped materials and the like, and can include insulators, conductors, and semiconductors. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g. over the central 20%, 40%, 50%, or 80% or more of the nanowire). A nanowire can be straight or can be e.g. curved or bent, over the entire length of its long axis or a portion thereof. In certain embodiments, a nanowire or a portion thereof can exhibit two- or three-dimensional quantum confinement. Nanowires according to this invention can expressly exclude carbon nanotubes, and, in certain embodiments, exclude "whiskers" or "nanowhiskers", particularly whiskers having a diameter greater than 100 nm, or greater than about 200 nm. Nanorods, nanowires nanocomposites, and other nanostructures are described in additional detail in U.S.SNo. 60/408,722, filed Sep. 5, 2002, the contents of which are incorporated herein in their entirety.

The phrase "structurally ordered nanostructures" as used herein refers to nanostructures that are substantially organized, ordered, aligned or otherwise "substantially non-random" either with respect to each other or with respect to a given axis or spatial position. A "plurality of structurally ordered nanostructures" is intended to include sets of non-randomly arrayed nanostructures (e.g., clustered, patterned or other spatially-organized arrangements of either aligned, oriented or non-oriented nanostructures), as well as sets of non-randomly oriented nanostructures (in which the majority of individual nanostructures are substantially non-random, but can be positioned in either regularly patterned arrays or irregular, e.g., scattered, arrangements).

The phrase "substantially non-random" (as used herein to describe the orientation and/or spatial arrangement of nanostructures) indicates that the nanostructures do not occupy a purely random distribution of orientations or spatial positioning with respect to each other. A collection of nanostructures is "substantially non-randomly oriented" if, when the position of each nanostructure is represented as a vector of a unit length in a three-dimensional rectangular coordinate system, at least one component of the vector average of the nanostructures' orientations is non-zero (when representing a nanostructure by a vector, any intrinsic difference between the two ends of the nanostructure can typically be ignored). For example, the nanostructures dispersed in a matrix (e.g., members of the plurality of structurally ordered nanostructures) would have substantially nonrandom orientations if a higher percentage of the nanostructures pointed in one direction (or in one of at least two specific directions) than in any other direction (e.g., if at least 10%, at least 25%, at least 50%, at least 75%, at least 90% or more of the nanostructures pointed in a particular direction). As another example, the plurality of nanorods or nanowires in a matrix would be substantially non-randomly oriented if a majority of the nanostructures had their long axes more nearly perpendicular than parallel to a surface of the film (or vice versa). The nanostructures can be substantially non-randomly oriented, yet not point in at least one specific direction. The preceding examples are for illustration only; a collection of nanostructures could possess less order than these examples yet still be substantially non-randomly oriented.

The term "substantially oriented nanostructures" or "substantially non-randomly oriented nanostructures" as used herein refers to sets or clusters of nanostructures in which at least 10%, at least 25%, at least 50%, at least 75%, at least 90% or more of the member nanostructures are oriented or positioned relative to a designated axis, plane, surface or three dimensional space. The orientation or positioning can be, for example, substantially parallel, substantially perpendicular, or at a selected angle (e.g., about 15°, 30°, 45°, or 60°). Substantially oriented nanostructures include, for example, sets of splayed or angularly-gathered sets of nanostructures (e.g., star patterns or hexagonal groupings) as well as substantially aligned populations of nanostructures.

The term "substantially aligned" as used herein refers to a subset of oriented nanostructures, in which at least 10%, at least 25%, at least 50%, at least 75%, at least 90% or more of the member nanostructures are oriented or positioned in a co-axial or parallel relationship, e.g., with one another as well as being oriented relative to the designated axis, plane or surface. For example, a plurality or set of substantially aligned nanostructures are positioned in a like manner with respect to one another such that the vectors representing the long axes of the member nanostructures differ from one another by no more than about 30° (e.g., the vectors are within about 30°, or preferably within about 15°, or more preferably within about 10° or within about 5° of one another).

The terms substantially perpendicular" and "substantially parallel" refers to orientations (or vectors representing populations of orientations) that vary by less than 25%, preferably by less than 10%, and more preferably by less than 5% from a perpendicular or parallel vector, respectively.

The term "about" refers to an acceptable variation of less than 25%, preferably less than 10%, and more preferably less than 5% of the cited value.

The phrase "regularly ordered" as used herein refers to a substantially non-random arrangement, spatial pattern or organizational structure in either two dimensions or three dimensions. An irregularly ordered arrangement or array lacks a substantially non-random arrangement, spatial pattern or organizational structure in at least two dimension. For example, see FIG. 1B in which the nanostructures are aligned with respect to one another (e.g., the z-axis) but irregularly arranged on the x-y plane.

The term "matrix" refers to a material, often a polymeric material, into which a second material (e.g., a nanostructure) is embedded, surrounded, or otherwise associated. A matrix is typically composed of one or more monomers, but may include other matrix components/constituents. Often the matrix constituents include one or more "addressable" components or complementary binding pairs, e.g. that optionally promote assembly and/or cross-linkage of the matrix.

"Alignment ligand" are components that interact with one or more nanostructures and can be used to order, orient and/or align the nanostructures associated therewith. In addition to having an affinity for a nanostructure, the alignment ligands of the present invention also typically include one or more complementary binding pairs or specific or nonspecific "molecular recognition functionality" incorporated therein.

An "array" of nanostructures is an assemblage of nanostructures. The assemblage can be spatially patterned or disordered. Optionally, the array can form or comprise one or more functional elements (e.g., a junction or collection of junctions); alternatively, the array can be non-functional.

As used herein, the phrase "plurality of receiving structures" refers to the portions of the matrix that are structured to receive, position, and/or structurally order the nanostructures within the composition. The receiving structures typically include cavities or void spaces into which the nanostructure is positioned; optionally, the receiving structures also include one or more functionalized chemical constituent that interacts with, associates with, binds to, or otherwise "receives," the nanostructure.

The term "complementary binding pair" refers to a set of molecules that have an affinity for one another. The affinity can be a non-specific molecular interaction, such as hydrogen boding between donor and acceptor molecules, or it can be a more complex or specific molecular recognition functionality, such as seen with a receptor and its complementary ligand. A complementary binding pair that employs a specific biochemical molecular recognition functionality is also termed a "biomolecule pair" or "bioconjugate pair."

The term "self organizing molecule" refers to a molecule that is capable of spontaneously assembling with other such molecules into stable, structured molecular aggregates or assemblages. One class of self-organizing molecules are components used to prepare self assembling monolayers (SAMs).

The terms "nanostructure binding component" and "head group" are used interchangeably herein to refer to various chemical constituents or moieties which are either coupled (e.g., in bound form) or capable of coupling (e.g. functionalized) to a nanostructure. The coupling can be either directly to the surface of the nanostructure, or in some cases, the coupling is to a surface ligand associated with the nanostructure (e.g., the surface ligand functions as a linking group between the nanostructure and the component having the nanostructure binding component).

An "aspect ratio" is the length of a first axis of a nanostructure divided by the average of the lengths of the second and third axes of the nanostructure, where the second and third axes are the two axes whose lengths are most nearly equal each other. For example, the aspect ratio for a perfect rod would be the length of its long axis divided by the diameter of a cross-section perpendicular to (normal to) the long axis.

DETAILED DESCRIPTION

Figure 1A:
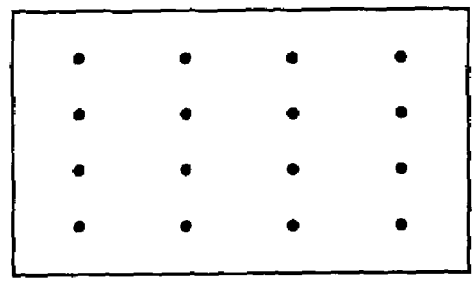
FIG. 1 provides pictorial representations of various embodiments of a composition having a plurality of structurally ordered nanostructures in a matrix.
Figure 1B:
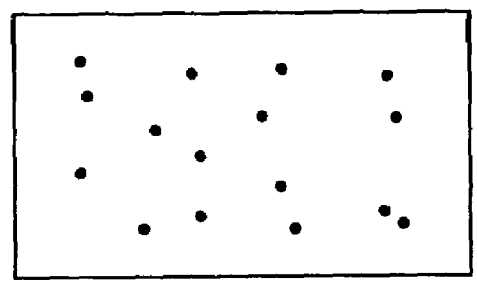
Figure 1C:
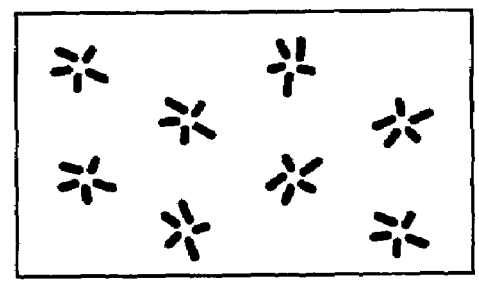
Figure 1D:
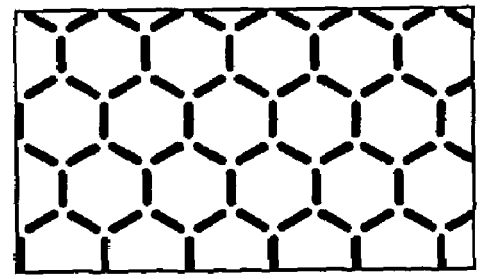

The present invention provides compositions having structurally ordered nanostructures, as well as methods for preparing the nanostructures, and devices in which they can be employed. While the detailed description and examples focuses on one or another type of nanostructure, it will be appreciated that the methods and compositions provided herein can be applied to any of a number of nanostructures known in the art, including, but not limited to, nanocrystals, nanodots, quantum dots, nanoparticles, nanotubes, nanowires, nanoribbons, nanotetrapods, nanoscale branched structures (e.g., dendrimer branching structures), and the like.

Structurally Ordered Nanostructures in a Matrix

In one aspect, the present invention provides a plurality of structurally ordered nanostructures in a matrix. In one embodiment, the structurally ordered nanostructures are substantially non-randomly oriented nanostructures. Optionally, the non-randomly oriented nanostructures are substantially aligned with respect to one another, and/or substantially aligned with a selected axis (e.g., at least 25%, at least 50%, at least 75%, at least 90% or more of the nanostructures are substantially aligned with the selected axis). For example, for compositions that are associated with or otherwise proximal to a substrate, the selected axis can be oriented substantially perpendicular to the surface of the substrate, parallel to the surface, or at a desired angle with respect to the surface. Optionally, the nanostructures are pointed in substantially the same direction. For example, for compositions including asymmetric nanostructure elements, the nanostructures are optionally oriented in the same direction.

In one embodiment, the present invention provides compositions having a plurality of non-randomly oriented nanostructures in a matrix. The oriented nanostructures can be provided, for example, as a regularly-ordered array of nanostructures. Alternatively, the oriented nanostructures are provided as an irregularly ordered arrangement. The nanostructures are typically oriented in relation to one another; (e.g., substantially parallel to one another, end to end, etc.); optionally, their orientation may also be described relative to a selected plane, space, or surface (e.g., parallel, perpendicular, at a selected angle, etc.). The non-random orientation of the nanostructures is maintained by the presence of the matrix in which the nanostructures are disposed.

Pictorial representations of exemplary embodiments of the present invention are provided in FIG. 1. In these embodiment, nanorods-like structures are depicted, along a z-axis (e.g., on end) in FIGS. 1A and 1B, angularly oriented in FIG. 1C, and arranged within the x-y plane in FIG. 1D. However, the present invention is not limited to the embodiments shown. A plurality of substantially non-randomly oriented nanostructures is depicted. In a particular embodiment, rather than substantially aligning the nanostructures with one another, the structures are oriented with respect to a selected angle (e.g., 45°).

Optionally, the present invention provides compositions having a plurality of non-randomly oriented nanostructures in a matrix. The oriented nanostructures can be provided, for example, as a regularly-ordered array of nanostructures. Alternatively, the oriented nanostructures are provided as an irregularly ordered arrangement. The nanostructures are oriented in relation to one another; (e.g., parallel to one another, end to end, etc.); optionally, their orientation may also be described relative to a selected plane or surface (e.g., parallel, perpendicular, at a selected angle, etc.). The non-random orientation of the nanostructures is maintained by the presence of the matrix in which the nanostructures are disposed.

In another aspect, the present invention provides compositions having an array of nanostructures in a matrix, wherein the array comprises a plurality of non-randomly arranged nanostructure members. Optionally, the nanostructure members of the array are also non-randomly oriented with respect to one another. Thus, FIG. 1 panel A also depicts a plurality of non-randomly arranged nanostructure members, in which the nanostructure members are also non-randomly oriented with respect to one another. FIG. 1, panel C depicts another embodiment of a composition having an array comprising a plurality of non-randomly arranged nanostructures. In this embodiment, the nanostructure members of the array are randomly oriented with respect to one another. A further embodiment of the array of non-randomly arranged nanostructures in a matrix is shown in FIG. 1, panel D, in which the nanostructure members are also non-randomly oriented with respect to one another. In this embodiment, the nanostructures are not parallel with one another, but are depicted as parallel with a planar surface such as a substrate. The compositions of the present invention need not be mainly 2-dimensional in nature. Further embodiments having 3-dimensional arrangements of nanostructures (for example, tetrameric and hexameric configurations, or other arrangements having interspersed sets of parallel nanostructural components) are also a feature of the present invention.

In a preferred embodiment of the present invention, the matrix is composed of one or more components that interact to form a plurality of receiving structures, which provides ordering and/or orientation to the nanostructures. The receiving structure typically includes a pore-like cavity or void space in the matrix that can accommodate the selected nanostructure (e.g., a nanorod), the dimensions of which are determined by the selected matrix components used in the composition. As such, the dimensions of the receiving structures can be selected and/or adjusted based upon the nanostructure to be used in the composition, but typically will range in diameter from about 1-2 nm to about 500 nm (e.g., from about 1 nm to about 20 nm; or from about 10 nm to about 50 nm; or from about 100 nm to about 250 nm; or from about 250 nm to about 500 nm).

The receiving structure optionally includes a chemical moiety that has an affinity for the nanostructure, such as a nanostructure binding moiety. The presence of a nanostructure binding moiety can be used to assist in the assembly of the composition, particularly for nanostructures having a directionality or "end" arising, for example, from an asymmetrical composition or configuration of nanocrystal components. Association of the nanostructure with the receiving structure and/or nanostructure binding moiety therein further provides for orientation and/or alignment of the nanostructures in the composition.

Typically, the matrix components of the present invention are modular in composition and synthesis, e.g., to provide varying sizes of receiving structures and/or varying nanostructure-binding functionalities based upon the specifics of the nanostructure to be incorporated into the composition. Typically, the matrix constituents of the present invention include a core or body component (which optionally is a conductive chemical moiety, such as those described in Ser. No. 10/928,625 co-filed herewith), and one or more attached constituents. The body structure can be either a conductive or a nonconductive chemical composition, depending in part upon the intended use of the nanostructure-containing composition. Often one or more "addressable" chemical constituents are attached to the body structure or otherwise incorporated into the matrix component. The addressable elements (e.g., sidechains, or "side arms") can be used, for example, for connecting adjacent matrix monomers, e.g., to provide embodiments in which one or more components of the matrix are chemically crosslinked (or capable of chemically cross-linking) to one another. In some embodiments, the addressable elements of the matrix monomers are designed to self-assemble to form the matrix.

The matrix component(s) also optionally includes a nanostructure binding moiety (e.g., a functionalized "head group") for coupling the matrix component to the nanostructure. In some embodiments of the compositions, one or more components of the matrix are chemically cross-linked (or capable of chemically cross-linking) to the nanostructures of the composition. Exemplary embodiments of matrix components which can be used in the compositions and methods of the present invention are provided in U.S. Ser. No. 60/452,232, as well as in Ser. No. 10/928,625 and international application PCT/US03/27847 by Whiteford et al., titled "Organic Species that Facilitate Charge Transfer to/from Nanocrystals" co-filed herewith.

Optionally, the matrix includes one or more components having multiple nanostructure-binding components (i.e., multidentate components). As an example, in some compositions of the present invention, the matrix component includes an additional "tail group" coupled to a portion (e.g., a terminus) of the body structure. The tail group can be designed to provide additional monomer coupling capacity, or additional nanostructure ligand binding capacity.

In a further embodiment, the compositions of the present invention are comprised of two or more matrix layers, each member layer having a plurality of non-randomly oriented nanostructures. The orientation of member nanostructures in a first matrix layer with respect to the member nanostructures in an adjacent matrix layer may or may not be aligned with one another. For example, member nanostructures in a first matrix layer may be aligned parallel (e.g., along the same orientation of direction) with respect to member nanostructures in the adjacent matrix layer. Alternatively, the member nanostructures in the two layers can be perpendicular to one another, or differ in orientation by a selected angular degree (e.g., by 15°, 30°, 45°, 60° etc. with respect to one another). Optionally, the member nanostructures in the layers are offset from one another (e.g., the layers of nanostructures are shifted in position, e.g., by a selected distance and/or controlled spacing), rather than being layered directly above one another. Alternatively, the member nanostructures in a first matrix layer are not aligned with respect to the member nanostructures in an adjacent matrix layer. The components used to prepare the matrices can be the same constituents, or they can be different matrix components. Optionally, n-type nanostructures are incorporated into one of the matrix layers (e.g., the first matrix layer), and p-type nanostructures are provided in the other (second) matrix layer. The two or more nanostructure-containing matrix layers can be used to prepare templated nanostructure compositions, e.g., to form p-n junctions and the like.

Furthermore, the compositions of the present invention can be comprised of two or more matrix layers, in which each member layer includes a plurality of non-randomly arranged nanostructures within the constituent matrices.

Methods of Preparing a Nanostructure-Matrix Composition

As a further aspect, the present invention also provides methods of preparing a plurality of non-randomly oriented or non-randomly dispersed nanostructures in a matrix. The methods include the steps of a) providing a plurality of nanostructures and a matrix composition, wherein the matrix composition comprises one or more matrix components that interact to form a plurality of receiving structures capable of accommodating the nanostructures; and b) heating and cooling the matrix composition in the presence of the plurality of nanostructures, thereby preparing the plurality of non-randomly oriented or non-randomly dispersed nanostructures in the matrix.

In a preferred embodiment of the present invention, the matrix is prepared from one or more components that interact to form a plurality of receiving structures (e.g., cavities or void spaces) that provide an ordering and/or orientation to the nanostructures. The configuration of the receiving structures is used to determine to arrangement, ordering and/or orientation (e.g., alignment) of the incorporated nanostructures. In the methods of the present invention, the nanostructures can be incorporated into the matrix either during (i.e., concomitant with) or after matrix formation. For example, in one embodiment of the methods, providing the matrix composition involves providing one or more matrix components (i.e., monomers) in a non-ordered or non-polymerized form. Subsequent heating and cooling of the matrix composition in the presence of the plurality of nanostructures allows the matrix to coalesce around the nanostructures, as a means of thermodynamically ordering the matrix around the plurality of nanostructures. The temperatures and reaction times employed in the methods of the present invention will vary with the selected matrix component, type of nanostructure, and the like, but could easily be determined by one of skill in the art without undue experimentation. Standard protocols for preparation of matrices can be found, for example, in Nalwa (2001) *Advanced Functional Molecules and Polymers* volumes 1-4; Kroschwitz et al., (1990) *Concise Encyclopedia of Polymer Science and Engineering* (Wiley-Interscience, New York, N.Y.); Chandrasekhar (1999) *Conducting Polymers, Fundamentals and Applications: A Practical Approach* (Academic Publishers, Boston, Mass., 1999); and Brandrup (1999) Polymer Handbook, 4th Edition (John Wiley & Sons, Ltd, New York, N.Y.), which references are incorporated herein in their entirety.

In an alternative embodiment, the matrix (and the plurality of receiving structures therein) is assembled prior to exposure to the plurality of nanostructures. Heating and cooling the pre-formed matrix in the presence of the plurality of nanostructures provides allows the nanostructures to be inserted into one or more of the plurality of receiving structures. Typically, the matrix host space ranges in diameter from about 1-2 nm to about 500 nm. However, the dimensions can be further engineered to meet any requirements of the desired composition, e.g., based upon the size of the nanostructure. Furthermore, the surface of the nanostructure proximal to the host space can be functionalized to provide any of a number of selected chemical functionalities as receiving structures (e.g., for binding to the nanostructure).

Any of a number of matrix compositions known in the art can be employed in the compositions and methods of the present invention. For example, a wide variety of nanostructure-compatible polymers are known to those of skill in the art (see e.g., Demus et al. (ed.) 1998 *Handbook of Liquid Crystals* Volumes 1-4 (John Wiley and Sons, Inc., Hoboken, N.J.); Brandrup (ed.) 1999 *Polymer Handbook*, (John Wiley and Sons, Inc.); Harper 2002 *Handbook of Plastics, Elastomers, and Composites,* 4th edition (McGraw-Hill, Columbus, Ohio); and Kraft et al. (1998) *Angew. Chem. Int. Ed.* 37:402-428.

Exemplary polymers for use in the present invention include, but are not limited to, thermoplastic polymers (e.g., polyolefins, polyesters, polysilicones, polyacrylonitrile resins, polystyrene resins, polyvinyl chloride, polyvinylidene chloride, polyvinyl acetate, or fluoroplastics); thermosetting polymers (e.g., phenolic resins, urea resins, melamine resins, epoxy resins, polyurethane resins); engineering plastics (e.g., polyamides, polyacrylate resins, polyketones, polyimides, polysulfones, polycarbonates, polyacetals); and liquid crystal polymers, including main chain liquid crystal polymers (e.g., poly(hydroxynapthoic acid)) and side chain liquid crystal polymers (e.g., poly [n-((4'(4"-cyanphenyl)phenoxy)alkyl) vinyl ether]). Certain embodiments include conductive organic polymers; see e.g. T. A. Skatherin (ed.) 1986 *Handbook of Conducting Polymers I.* (Marcel Dekker, New York). Examples of conductive polymers for use as matrices of the present invention include, but are not limited to, poly(3-hexylthiophene) (P3HT), poly[2-methoxy, 5-(2'-ethyl-hexyloxy)-p-phenylene-vinylene] (MEH-PPV), poly(p-phenylene vinylene) (PPV), and polyaniline.

Conductive compositions as provided in U.S. Ser. No. 60/452,232 and Ser. No. 10/928,625, co-filed herewith, can also be used as matrix components of the present invention. The conductive compositions contain a conjugated organic species and at least one binding group capable of interacting with a nanostructure surface; during use, the compositions are coupled via the binding group to the nanostructure surface, such that the compositions are substantially conductive to electrons and/or holes being transported by/through the nanostructure (e.g., during the process of extracting or injecting the electrons or holes). The compositions of the present invention can optionally be derivatized with additional chemical groups, e.g., to modulate the electronic conjugation of the core organic species, to couple or align adjacent nanostructures, to provide additional chemical functionalities in the matrix receiving structures, or to facilitate dispersion, mixing and/or blending of nanostructures in various matrices. For example, conductive compositions that include a conjugated organic species as a body structure, coupled to a nanostructure-binding head group, an alkyne-containing tail group, and addressable sidechain elements for crosslinking or coupling of the compositions, can be used as matrix components in the present invention.

Optionally, one or more components of the matrix are chemically crosslinked, or are capable of chemically crosslinking to one another. Traditional methods of crosslinking include, but are not limited to, various condensation reactions, free radical curing (e.g., via ultraviolet light, electron beam or peroxides), thermal curing, and amine crosslinking using Michael Addition reaction chemistry. The cross linkages are typically generated through one or more functionalized moieties coupled to the body structure of the matrix (e.g., sidechains). In addition to traditional crosslinking agents like acrylates and methacrylates, the matrix components can include photolabile groups that, once activated by exposure to light, can be removed to expose a reactive site for crosslinking adjacent matrix monomers. A wide variety of photolabile groups and their associated linkage chemistries are well known in the art. For example, the cross-linker group is capped by a protecting group that is cleaved or rendered cleavable upon exposure to light of a desired wavelength. Examples of known photolabile protecting groups include nitroveratryloxycarbonyl protecting groups, such as NVOC and MeNVOC, as well as nitropiperonyloxycarbonyl protecting groups, such as NPOC and MeNPOC, and others, e.g., PyMOC. The use of these protecting groups and others in, for example, photolithographic activation of surfaces, is described in, e.g., U.S. Pat. No. 5,489,678 and U.S. Pat. No. 6,147,205. Optionally, the photo-removable protecting group exposed an amine moiety, which then can react with a proximal activated carboxylic acid to form the cross-linkage.

One exemplary chemical moiety that can be used to connect adjacent matrix components is a diacetylene group. However, any of a number of conjugation reagents, such as zero-length cross linkers, homobifunctional cross-linkers, heterobifunctional cross-linkers, and the like, are known in the art and can be incorporated into the matrix components of the present invention (see, for example, Hermanson (1996) *Bioconjugate Techniques*, Academic Press, New York; and Brandrup (1999) *The Polymer Handbook*, 4th Edition, John Wiley & Sons, Ltd, New York, N.Y.).

In addition, one or more components of the matrix are optionally chemically cross-linked or capable of chemically cross-linking to one or more of the nanostructures, via one or more functionalized "head groups" (e.g., nanostructure binding groups). Exemplary chemical moieties for use as functionalized head groups in the present invention include, but are not limited to, phosphonic acid, carboxylic acid, amine, phosphine, phosphine oxide, carbamate, isocyanate, nitro, salen, dithiolene, catechol, N,O-chelate ligand, P,N-chelate ligand, and/or thiol moieties.

Alternatively, urea, derivatives of nanocrystal growth terminators, or other nitrogen-containing aromatic compounds or heterocycles (e.g., various amides, imidazoles, benzoimidazoles, pyridines, pyrimidines, purines, or quinolines) can also be used as nanostructure-binding head group moieties in the compositions and methods of the present invention. Exemplary compounds include, but are not limited to, derivatives of 2-aminopyridine, 3-aminopyridine, 1,2-diaminopyridine, and other compounds commonly used as inorganic nitrogen-containing ligands.

In alternative arrangements, the nanostructure binding head groups may be in an ionizable form, such that under certain conditions, e.g., low or high pH, the functional group has substantial affinity for the nanostructure, e.g., a strong positive or negative charge, while under different environmental conditions, the affinity is substantially lower, or is even negative.

In some embodiments, the functionalized (or bound) head group is a monodentate structure (e.g., includes a single moiety capable of interacting with the nanocrystal). In an alternate embodiment, the head group is a multidentate structure capable of a plurality of interactions with the nanostructure surface, or a ligand associated with the nanostructure surface.

The present invention also provides a plurality of non-randomly oriented or non-randomly dispersed nanostructures in a matrix as prepared by a method provided herein.

Nanostructures with Interacting Alignment Ligands

In another aspect, the present invention provides compositions having a plurality of selectively-oriented nanostructures in which the members nanostructures are associated with one or more alignment ligands. The alignment ligands are molecules that have one or more chemical or biochemical functionalities that have an attraction for one another. Typically, a portion of a first alignment ligand on a first nanostructure interacts with a complementary portion of a second alignment ligand on an adjacent member nanostructure. Multiple alignment ligands are associated with each nanostructure, each of which can independently interact with a complementary alignment ligands on adjacent nanostructures; these interactions can be used to generate (and/or maintain) the selective orientation of the population of nanostructures (e.g., providing structural order to the nanostructures).

The thermodynamic expression $\Delta G = \Delta H - T\Delta S$ describes the relationship between enthalpy ($\Delta H$) and entropy ($\Delta S$) relating to Gibb's free energy ($\Delta G$). Heating and cooling of the composition allow the entropy term ($\Delta S$) to be used to overcome the energy barrier ($\Delta H$) in breaking up random binding of complementary pairs. The complementary binding pairs can then overcome the energy barrier preventing the thermodynamically-favored ordered array binding. Further, an entropy increase will also be gained upon heating and cooling as solvent molecules are ejected from the void space between matrices by forming a host(matrix)-guest(nanocrystal or nanowire) or inclusion molecule with the nanowire/nanocrystal, thereby preferring the ordered array. This nanowire/nanocrystal-matrix inclusion complex will also increase crystallinity of the entire system thereby imparting stability to the preferred ordered structure and driving the equilibrium towards the ordered array.

Typically, the first and second alignment ligands are molecules which have selected molecular recognition functionalities or moieties. As one example, the molecular recognition between the first and second alignment ligands can be a simple chemical interaction, such as the hydrogen bonding interaction that occurs between an amine moiety and a hydroxyl moiety. Thus, any of a variety of amine-containing compounds and alcohol-containing compounds can be employed as first and second alignment ligands in the present invention. Alignment ligands can be designed to take advantage of any of a number of basic molecular interactions beyond hydrogen bonding. For example, coulombic interactions, van der Waals forces, ionic interactions, covalent bond formation, and/or various hydrophobic or hydrophilic interactions can be employed for complex formation between the first and second alignment ligands. The interactions can be of varying number (monodentate or multidentate) and varying strength (weak, intermediate or strong), but typically the interactions are reversible, at least during initial formation of the composition.

Figure 3:
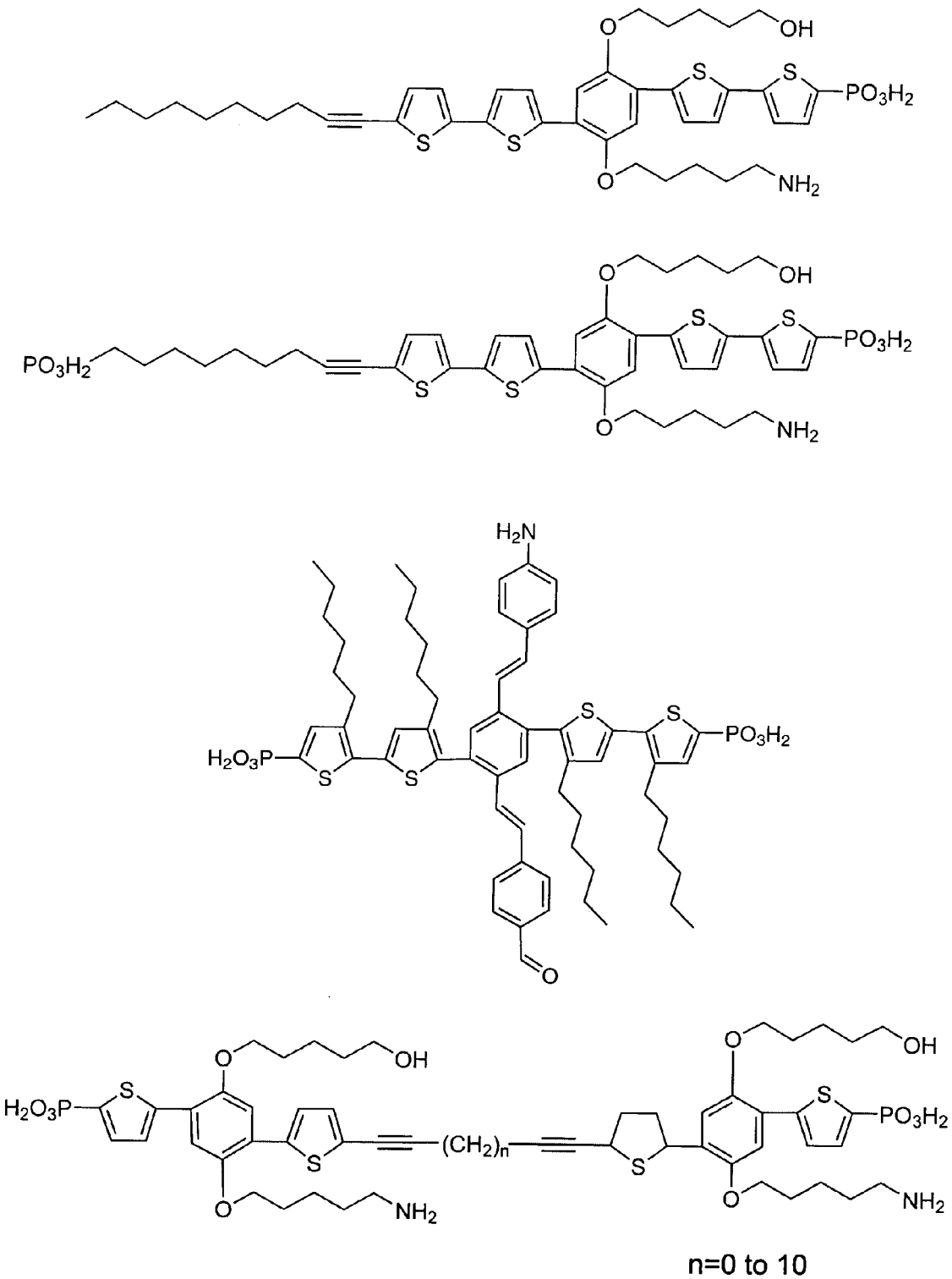
FIG. 3 depicts embodiments of alignment ligands for use in the present invention.

Conductive compositions as provided in U.S. Ser. No. 60/452,232 and Ser. No. 10/928,625 co-filed herewith can be used, or modified for use, as alignment ligands of the present invention. For example, conductive compositions that include either a non-conjugated or a conjugated organic species as a body structure, coupled to a nanostructure-binding head group, an alkyne tail group having a second nanostructure-binding moiety, and two sidechains (coupled to the body structure) incorporating complementary binding moieties (e.g., an amine moiety and a hydroxyl moiety) can be used in the methods, devices and compositions of the present invention. Exemplary compositions for use as alignment ligands are shown in FIG. 3. The more rigid the portion of the molecule used to crosslink adjacent ligands, the more predictable the alignment (and the resulting "2-dimensional" sheet or 3-dimensional composition) will be. While methylene, aryl, acetylene and alkene groups can be incorporated into the alignment composition (e.g., within the head group, tail group or sidechain moieties), the more "floppy" constituents (e.g., methylenes) typically produce less conductive compositions and/or less thermodynamically predictable compositions.

Bioconjugate/biomolecular pairs provide another example of complementary molecular recognition moieties which can be used in the present invention. Various biomolecular pairings and interactions are described in detail in, for example, *Bioconjugate Techniques* by Hermanson (1996, Academic Press, New York). Any of a number of complementary biomolecules known in the art can be used as the first and second alignment ligands. For example, the interaction between an antibody and an antigen that binds to the antibody can be used to orient adjacent nanostructures, as can the interaction between: biotin and avidin or streptavidin; a lectin and a carbohydrate ligand; or a protein (e.g., a receptor) and the complementary ligand. Even complementary nucleic acids, and/or an aptamer and an aptamer ligand, can be employed as alignment ligands in the present invention.

Optionally, one of the alignment ligands can be a moiety used to functionalize the surface of the nanostructure (e.g., via silanation, nitridation, or a functionalizing plasma such as described in PCT/US03/09827 to Empedocles).

Figure 2:
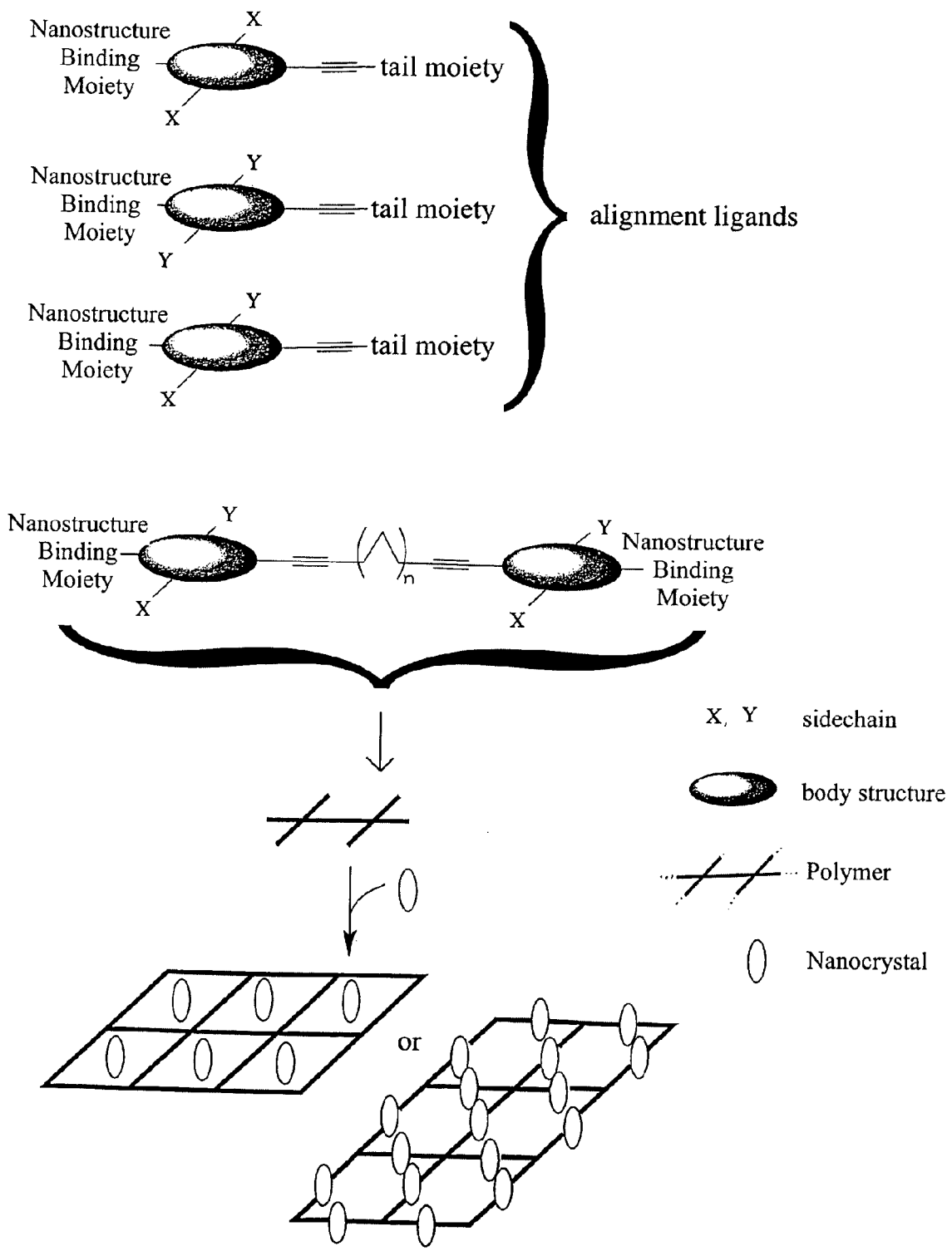
FIG. 2 provides a schematic representation of interactions between nanostructures and either monofunctional or multifunctional first and second alignment ligands as described in the present invention.

In some embodiments of the present invention, the first and/or second alignment ligand has more than one molecular recognition functionality per ligand (e.g., a multifunctional or multidentate ligand). For example, a multidentate alignment ligand can have multiple amine functionalities, or multiple copies of biotin attached to a core structure. Alternatively, the alignment ligand can be multifunctional by having both halves (complements) of the selected conjugating embodiment; e.g., both a biotin moiety and an avidin moiety. For example, in some embodiments, the first and second alignment ligands are provided by the same molecule. A schematic representation of exemplary monofunctional and multifunctional alignment ligand embodiments are provided in FIG. 2.

Molecular self assembly is the spontaneous organization of selected molecules into organized two-dimensional (or three-dimensional) configurations based upon intermolecular interactions such as those described herein. Organization of the alignment ligand:nanostructure composition optimally leads to a thermodynamic minimum. Complementary binding of alignment ligands, as well as the presence of the nanostructures filling void spaces within the matrix (and thereby ejecting solvent molecules to compensate for entropy loss while increasing crystallinity of the system) and the binding of nanostructures by head attachment groups results in an overall reduction of Gibbs free energy and a thermodynamically favored equilibrium. An exemplary embodiment of this concept is seen with self-organizing molecules, such as those that form self assembling monolayers or clusters (see, for example, Caulder et al. (2001) *J. Am. Chem. Soc.* 123:8923-8938; Colvin et al. (1992) *J. Am. Chem. Soc.* 114:5221-5230; Leininger et al. (2000) *Chem. Rev.* 100:853-908; Schenning et al. (2002) *J. Am. Chem. Soc.* 124:1269-1275; Shimazaki et al. *Langmuir* 14:2768-2773; Stockton and Rubner (1997) *Macromolecules* 30:2717-2725; and Su and Mrksich (2002) *Angew. Chem. Int Ed.* 41:4715-4718).

The alignment ligands are associated either directly with the nanostructure surface, or with other ligands already associated or bound to the nanostructure surface. In certain embodiments of the present invention in which the nanostructure surface is accessible and/or available for binding, the alignment ligands further include one or more functionalized head group(s) capable of binding to a nanostructure surface or to a ligand associated with a nanostructure surface. The head group functionality selected for use in the composition will depend in part upon the type of nanostructure being aligned. Exemplary chemical moieties which can be used to couple the alignment ligand to the nanostructure surface include, but are not limited to, phosphonic acid, carboxylic acid, amine, phosphine, phosphine oxide, carbamate, urea, pyridine, isocyanate, amide, nitro, pyrimidine, imidazole, salen, dithiolene, catechol, N,O-chelate ligand, P,N-chelate ligand, thiol, or a combination of these moieties.

A chelating P,N ligand includes a phosphorous heteroatom and a nitrogen heteroatom capable of bonding or binding through a lone pair of electrons that may form a hydrogen, coordination or covalent bond. Exemplary chelating P,N ligands include 2-triphenyl phosphino-pyridine, 2-triethyl phosphino-aniline, diphenylphosphino ethyl amine A Chelating N,O ligand includes a nitrogen heteroatom and an oxygen heteroatom capable of bonding or binding through a lone pair of electrons that may form a hydrogen, coordination or covalent bond. Exemplary chelating N,O ligands include ethanol amine and aniline phosphinate, as well as 2-hydroxyaniline, 3,5-diaminobenzoic acid, guanine (G), cytosine (C), and G^C bicyclic bases (see, for example, Fenniri et al. "Entropically driven self-assembly of multi-channel rosette nanotubes" presented at the Arthur M. Sackler Colloquium of the National Academy of Sciences, May 18-20, 2001).

Nanostructure:alignment ligand compositions are also provided in the present invention. The distance between adjacent nanostructures is determined in part by the composition and conformation of the associated alignment ligand. In some embodiments, the adjacent nanostructures (or vectors representing adjacent nanostructures) do not deviate in distance (e.g. the span between the adjacent nanostructures) by more than about 10%, or optionally, by more than about 5%.

Methods for Preparing Selectively-Oriented Nanostructures

The present invention also provides methods for preparing a plurality of selectively-oriented nanostructures, in which the nanostructure population includes a first set of nanostructures associated with a first alignment ligand, and a second set of nanostructures associated with a second alignment ligand.

Any of a number of embodiments of alignment ligands can be used to prepare the selectively-oriented nanostructures, such as those depicted in FIG. 3. In some embodiments, the first and second alignment ligands are distinct chemical entities (FIG. 3, panel A), while in other embodiments, a single multifunctional molecule acts as both the first alignment ligand and the second alignment ligand (FIG. 3, panel B). For example, the first alignment ligand can include a biotin moiety, while the complementary second alignment ligand has an avidin moiety incorporated into the structure. The biotin and avidin functionalities can be incorporated into two separate ligand molecules; alternatively, they can be two portions of a multifunctional ligand molecule (e.g., a single alignment ligand has both molecular recognition functionalities incorporated therein).

Thus, in certain embodiments of the methods, the first set of nanostructures further includes the second alignment ligand and the second set of nanostructures also includes the first alignment ligand (FIG. 3, panel C). However, dual alignment functionality of a given nanostructure can also be achieved, for example, by positioning one or more first alignment ligands along one portion of a given nanostructure, and second alignment ligand(s) along a second portion of the nanostructure (FIG. D).

As noted above, in a preferred embodiment, the alignment ligands are coupled to the nanostructures, either via direct coupling to the nanostructure surface, or to an additional (e.g. intervening) ligand associated with the nanostructure. The first alignment ligands on the first set of nanostructure are then interacted with the second alignment ligand on a second adjacent nanostructure, to selectively orient the plurality of nanostructures.

In some embodiments, a plurality of nanowires are prepared for use as the plurality of nanostructures, by any of a number of techniques known in the art, such as vapor deposition, or solution deposition. However, alternative nanostructure embodiments (nanocrystals, nanodots, nanorods, etc.) could be substituted in the methods for the nanowires. The nanostructures are then treated, e.g., by vapor phase depositing the first alignment ligand on a surface of a first portion of the plurality of nanostructures; and vapor phase depositing the second alignment ligand on a surface of a second portion of the plurality of nanostructures. Optionally, the methods further include the step of removing the nanowire-alignment ligand conjugates from the substrate prior to interacting the first and second alignment ligands.

In some embodiments, the first and second portions of the nanowire are separate populations of nanowires. In embodiments in which the alignment ligand is not a monofunctional ligand (i.e., having only one of the complementary molecular recognition elements), the method generates two populations of ligand-associated nanostructures. In an alternative embodiment in which the first and second portions comprise separate regions of individual nanowires, for example, two termini of the nanostructures, a single (non-symmetrical) population of nanowires is generated.

Optionally, the first and second alignment ligands comprise molecules incorporating a selected molecular interaction (e.g., hydrogen bond formation), a selected molecular recognition functionality (e.g., a biomolecular pair) or other self organizing molecules. Exemplary the first and second alignment ligands which can be designed to interact via hydrogen bonding include, but are not limited to, an amine-containing compound and an alcohol-containing compound.

Preferably, the methods of the present invention include the step of coupling the alignment ligands to the surface of the associated nanostructures. In these embodiment of the methods, alignment ligands having a functionalized head group or other nanostructure-binding moiety are employed, for binding the alignment molecule to the nanostructure surface. Exemplary chemical functionalities which interact with nanostructure surfaces (or with ligands associated therewith) include, but are not limited to, phosphonic acid, carboxylic acid, amine, phosphine, phosphine oxide, carbamate, urea, pyridine, isocyanate, amide, nitro, pyrimidine, imidazole, salen, dithiolene, catechol, N,O-chelate ligand, P,N-chelate ligand, thiol moieties (or combinations thereof). Optionally, the first and second alignment ligands further comprise a crosslinking or polymerizable element, such that interacting the first and second alignment ligands leads to crosslinking or polymerization of the first and second alignment ligands.

In some embodiments of the methods, interacting the first and second alignment ligands is performed by heating and cooling the plurality of nanostructures. Alternatively, interacting the first and second ligands can be achieved by mixing the ligands with solvents in which the ligands have different solubilities (e.g., due to polarity). Exemplary solvents that can be used include, but are not limited to, chloroform, toluene, and chlorobenzene.

In a further embodiment, the methods of the present invention further include the step of affixing the plurality of selectively-oriented nanostructures to a substrate. The first and second alignment ligands can optionally be removed.

Clusters of Oriented Nanostructures

As a further aspect, the present invention also provides a plurality of clusters of selectively-oriented nanostructures on a substrate. Unlike the previously-described embodiments of the present invention, these clusters are provided independent of surrounding matrix. The orientation of the selectively-oriented nanostructures can be perpendicular to a surface or other defined x,y plane with which the nanostructures are associated, or the orientation can be an orientation other than normal to the surface or plane. The clusters of selectively-oriented nanostructures can be generated, for example, to provide an aggregation of functional elements such as junctions at defined locations on a substrate, e.g., for interfacing with additional nanoscale or microscale electronics).

Nanostructure Compositions

Any of a number of nanostructures (or combination of nanostructures) can be used in the compositions and methods of the present invention, including, but not limited to, nanocrystals, nanodots, nanospheres, nanorods, nanowires, nanoribbons, nanotetrapods, various branched structures (e.g., dendrimer branching structures), quantum dots, and the like.

Various methodologies for the manufacture of nanostructures from a semiconducting material, a ferroelectric material, a metal, etc., are known in the art. For example, semiconductor nanocrystals have been described in great detail (see, e.g., Huynh, et al. (2002) "Hybrid Nanorod-Polymer Solar Cells" Science 295:2426-2427; Huynh, et al., Adv. Materials 11(11):923 (1999), Greenham et al., Phys. Rev. B 54(24):17628-17637 (1996), and U.S. Pat. No. 6,239,355). In some embodiments of the present invention, the nanostructures are prepared from semiconductive materials. Semiconductor nanostructures include a wide range of different materials that exist as nano-sized particles or structures, e.g., having at least one cross sectional dimension of less than about 500 nm, and preferably, less than 100 nm. These nanostructures may be comprised of a wide range of semiconductive materials, including for example, group III-V, group II-VI and group IV semiconductors or alloys of these materials. For example, CdSe, CdTe, InP, InAs, CdS, ZnS, ZnO, ZnSe, PbSe, PbS, and/or PbTe semiconductors, or their alloys, are optionally used as at least a portion of the nanostructure component.

Additional examples of nanowires include semiconductor nanowires as described in Published International Patent Application Nos. WO 02/17362 to Lieber et al. ("Doped elongated semiconductors, growing such semiconductors, devices including such semiconductors and fabricating such devices"), WO 02/48701 to Lieber et al. ("Nanosensors"), and WO 01/03208 to Lieber et al. ("Nanoscopic Wire-based devices, arrays, and methods of their manufacture"), carbon nanotubes, and other elongated conductive or semiconductive structures of like dimensions. Nanostructures comprised of semiconductor material selected from, e.g., Si, Ge, Sn, Se, Te, B, Diamond, P, B—C, B—P(BP6), B—Si, Si—C, Si—Ge, Si—Sn and Ge—Sn, SiC, BN/BP/BAs, AlN/AlP/AlAs/AlSb, GaN/GaP/GaAs/GaSb, InN/InP/InAs/InSb, BN/BP/BAs, AlN/AlP/AlAs/AlSb, GaN/GaP/GaAs/GaSb, InN/InP/InAs/InSb, ZnO/ZnS/ZnSe/ZnTe, CdS/CdSe/CdTe, HgS/HgSe/HgTe, BeS/BeSe/BeTe/MgS/MgSe, GeS, GeSe, GeTe, SnS, SnSe, SnTe, PbO, PbS, PbSe, PbTe, CuF, CuCl, CuBr, CuI, AgF, AgCl, AgBr, AgI, BeSiN$_2$, CaCN$_2$, ZnGeP$_2$, CdSnAs$_2$, ZnSnSb$_2$, CuGeP$_3$, CuSi$_2$P$_3$, (Cu, Ag)(Al, Ga, In, Tl, Fe)(S, Se, Te)$_2$, Si3N$_4$, Ge3N$_4$, Al$_2$O$_3$, (Al, Ga, In)$_2$(S, Se, Te)$_3$, Al$_2$CO, and/or an appropriate combination of two or more such semiconductors are contemplated in the present invention. In certain aspects, the semiconductor may also include a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si.; or an n-type is selected from a group consisting of: Si, Ge, Sn, S, Se and Te.

Additional methods for making nanostructures (e.g., by patterning nanostructure catalysts and/or precursors on a substrate, oriented growth in magnetic fields, use of fluidic assembly arrays, and radially deposition of nanostructures on a substrate) are described, for example, in international applications PCT/US03/09827 to Empedocles and PCT/US03/09991 to Duan.

Common methods for making silicon nanostructures include vapor liquid solid growth (VLS), laser ablation (laser catalytic growth) and thermal evaporation. See, for example, Morales et al. (1998) "A Laser Ablation Method for the Synthesis of Crystalline Semiconductor Nanowires" *Science* 279, 208-211 (1998). In one example approach, a hybrid pulsed laser ablation/chemical vapor deposition (PLA-CVD) process for the synthesis of semiconductor nanowires with longitudinally ordered heterostructures is used. See, Wu et al. (2002) "Block-by-Block Growth of Single-Crystalline Si/SiGe Superlattice Nanowires" Nano Letters 2:83-86.

In general, several methods of making nanostructures and other resulting nanostructures have been described and can be applied in the methods, systems and devices herein. In addition to Morales et al. and Wu et al. (above), See, for example, Lieber et al. (2001) "Carbide Nanomaterials" U.S. Pat. No. 6,190,634 B1; Lieber et al. (2000) "Nanometer Scale Microscopy Probes U.S. Pat. No. 6,159,742; Lieber et al. (2000) "Method of Producing Metal Oxide Nanorods" U.S. Pat. No. 6,036,774; Lieber et al. (1999) "Metal Oxide Nanorods" U.S. Pat. No. 5,897,945; Lieber et al. (1999) "Preparation of Carbide Nanorods" U.S. Pat. No. 5,997,832; Lieber et al. (1998) "Covalent Carbon Nitride Material Comprising C2N and Formation Method; Thess, et al. (1996) "Crystalline Ropes of Metallic Carbon Nanotubes" *Science* 273, 483-486; Lieber et al. (1993) "Method of Making a Superconducting Fullerene Composition By Reacting a Fullerene with an Alloy Containing Alkali Metal U.S. Pat. No. 5,196,396, and Lieber et al. (1993) Machining Oxide Thin Films with an Atomic Force Microscope: Pattern and Object Formation on the Nanometer Scale" U.S. Pat. No. 5,252,835. Recently, one dimensional semiconductor heterostructure nanocrystals which can be arranged/positioned/oriented, etc., according to the present invention, have been described. See, e.g., Bjork et al. (2002) "One-dimensional Steeplechase for Electrons Realized" Nano Letters 2:86-90.

In another approach, synthetic procedures to prepare individual nanowires on surfaces and in bulk are described, for example, by Kong, et al. (1998) "Synthesis of Individual Single-Walled Carbon Nanotubes on Patterned Silicon Wafers" Nature 395, 878-881, and Kong, et al. (1998), "Chemical Vapor Deposition of Methane for Single-Walled Carbon Nanotubes" *Chem. Phys. Lett.* 292, 567-574.

In yet another approach, substrates and self assembling monolayer (SAM) forming materials can be used, e.g., along with microcontact printing techniques to make nanostructures, such as those described by Schön, Meng, and Bao (2001) "Self-assembled monolayer organic field-effect transistors" *Nature* 413:713; Zhou et al. (1997) "Nanoscale Metal/Self-Assembled Monolayer/Metal Heterostructures" *Applied Physics Letters* 71:611; and WO 96/29629 (Whitesides, et al., published Jun. 26, 1996). A preferred embodiment of a composition that can be used to prepare a self-assembled monolayer typically includes a thiol component that can be attached to a substrate (e.g., gold) and one or more aliphatic chains that interact and pack to form an organized layer.

Synthesis of nanocrystals of various composition is described in, e.g., Peng et al. (2000) "Shape control of CdSe nanocrystals" Nature 404:59-61; Puntes et al. (2001) "Colloidal nanocrystal shape and size control: The case of cobalt" *Science* 291:2115-2117; U.S. Pat. No. 6,306,736 to Alivisatos et al. (Oct. 23, 2001) entitled "Process for forming shaped group III-V semiconductor nanocrystals, and product formed using process"; U.S. Pat. No. 6,225,198 to Alivisatos et al. (May 1, 2001) entitled "Process for forming shaped group II-VI semiconductor nanocrystals, and product formed using process"; U.S. Pat. No. 5,505,928 to Alivisatos et al. (Apr. 9, 1996) entitled "Preparation of III-V semiconductor nanocrystals"; U.S. Pat. No. 5,751,018 to Alivisatos et al. (May 12, 1998) entitled "Semiconductor nanocrystals covalently bound to solid inorganic surfaces using self-assembled monolayers"; U.S. Pat. No. 6,048,616 to Gallagher et al. (Apr. 11, 2000) entitled "Encapsulated quantum sized doped semiconductor particles and method of manufacturing same"; and U.S. Pat. No. 5,990,479 to Weiss et al. (Nov. 23, 1999) entitled "Organo luminescent semiconductor nanocrystal probes for biological applications and process for making and using such probes."

Growth of nanostructures such as nanowires having various aspect ratios, including nanowires with controlled diameters, is described in, e.g., Gudiksen et al (2000) "Diameter-selective synthesis of semiconductor nanowires" J. Am. Chem. Soc. 122:8801-8802; Cui et al. (2001) "Diameter-controlled synthesis of single-crystal silicon nanowires" *Appl. Phys. Lett.* 78: 2214-2216; Gudiksen et al. (2001) "Synthetic control of the diameter and length of single crystal semiconductor nanowires" *J. Phys. Chem. B* 105:4062-4064; Morales et al. (1998) "A laser ablation method for the synthesis of crystalline semiconductor nanowires" *Science* 279: 208-211; Duan et al. (2000) "General synthesis of compound semiconductor nanowires" *Adv. Mater.* 12:298-302; Cui et al. (2000) "Doping and electrical transport in silicon nanowires" *J. Phys. Chem. B* 104:5213-5216; Peng et al. (2000), supra; Puntes et al. (2001), supra; U.S. Pat. No. 6,225,198 to Alivisatos et al., supra; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods"; Urbau et al. (2002) "Synthesis of single-crystalline perovskite nanowires composed of barium titanate and strontium titanate" J. Am. Chem. Soc., 124, 1186; Yun et al. (2002) "Ferroelectric Properties of Individual Barium Titanate Nanowires Investigated by Scanned Probe Microscopy" Nano Letters 2, 447; and published PCT application nos. WO 02/17362, and WO 02/080280.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" J. Am. Chem. Soc. 123:5150-5151; and Manna et al. (2000) "Synthesis of Soluble and Processable Rod-,Arrow-, Teardrop-, and Tetrapod-Shaped CdSe Nanocrystals" J. Am. Chem. Soc. 122:12700-12706. Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys"; U.S. Pat. No. 6,413,489 to Ying et al. (Jul. 2, 2002) entitled "Synthesis of nanometer-sized particles by reverse micelle mediated techniques"; and Liu et al. (2001) "Sol-Gel Synthesis of Free-Standing Ferroelectric Lead Zirconate Titanate Nanoparticles" *J. Am. Chem. Soc.* 123:4344. Synthesis of nanoparticles is also described in the above citations for growth of nanocrystals, nanowires, and branched nanowires.

Synthesis of core-shell nanostructure heterostructures are described in, e.g., Peng et al. (1997) "Epitaxial growth of highly luminescent CdSe/CdS core/shell nanocrystals with photostability and electronic accessibility" J. Am. Chem. Soc. 119:7019-7029; Dabbousi et al. (1997) "(CdSe)ZnS core-shell quantum dots: Synthesis and characterization of a size series of highly luminescent nanocrystallites" J. Phys. Chem. B 101:9463-9475; Manna et al. (2002) "Epitaxial growth and photochemical annealing of graded CdS/ZnS shells on colloidal CdSe nanorods" J. Am. Chem. Soc. 124: 7136-7145; and Cao et al. (2000) "Growth and properties of semiconductor core/shell nanocrystals with InAs cores" J. Am. Chem. Soc. 122:9692-9702. Similar approaches can be applied to growth of other core-shell nanostructures. See, for example, U.S. Pat. No. 6,207,229 (Mar. 27, 2001) and U.S. Pat. No. 6,322,901 (Nov. 27, 2001) to Bawendi et al. entitled "Highly luminescent color-selective materials".

Growth of homogeneous populations of nanowires, including nanowire heterostructures in which the different materials are distributed at different locations along the long axis of the nanowire is described in, e.g., published PCT application nos. WO 02/17362, and WO 02/080280; Gudiksen et al. (2002) "Growth of nanowire superlattice structures for nanoscale photonics and electronics" Nature 415:617-620; Bjork et al. (2002) "One-dimensional steeplechase for electrons realized" Nano Letters 2:86-90; Wu et al. (2002) "Block-by-block growth of single-crystalline Si/SiGe superlattice nanowires" Nano Letters 2, 83-86; and U.S. patent application No. 60/370,095 (Apr. 2, 2002) to Empedocles entitled "Nanowire heterostructures for encoding information." Similar approaches can be applied to growth of other heterostructures and applied to the various methods and systems herein.

Device

The aligned and/or oriented nanostructures of the present invention can be used or assembled into any of a number of functional elements or devices. A variety of methods of making one-dimensional structures for use in small scale devices and device elements and methods of making junctions and circuits of such devices have been described. or example, nanostructures such as nanowires and nanotubes can transport electrons and holes, providing the building blocks for nanoscale electronic devices. Studies of charge carrying properties of such elements have led to the creation of field effect transistors, single electron transistors, rectifying junctions, and even complete circuits.

For example, various device subcomponents such as memory, logic, switches, and the like, utilizing nanostructures or other small scale structures have been described and can be adapted to the present invention, e.g., by using the nanostructure compositions and arrays of nanostructures, ordered nanostructures, of the present invention, to construct like devices. See, e.g., Huang et al. (2001) "Logic Gates and Computation from Assembled Nanowire Building Blocks" *Science* 294:1313; Huang et al. Huang et al. (2001) "Directed Assembly of One-Dimensional Nanostructures Into Functional Networks" *Science* 291:630; Chung et al. (2000) "Si Nanowire Devices" *Appl. Phys. Lett.* 76:2068; Bachtold et al. (2001) "Logic Circuits with Carbon Nanotube Transistors" *Science* 294:1317; Schön et al. (2001) "Field-Effect Modulation of the Conductance of Single Molecules" *Science* 294: 2138; Derycke et al. (August 2001) "Carbon Nanotube Inter- and Intramolecular Logic Gates" *Nano Letters* published on line; Kuekes et al. (2000) "Molecular Wire Crossbar Memory" U.S. Pat. No. 6,128,214; Collier et al. (1999) "Electronically Configurable Molecular-Based Logic Gates" *Science* 285:391-394; Chen et al. (1999) "Observation of a Large On-Off Ratio and Negative Differential Resistance in an Electronic Molecular Switch" *Science* 286:1550. Gallagher et al. (1997) "Magnetic Memory Array Using Magnetic Tunnel Junction Devices in the Memory Cells" U.S. Pat. No. 5,640,343, Glen et al. (1993) "Large Capacity Solid State Memory" U.S. Pat. No. 5,274,602; Service (2001), "Assembling Nanocircuits From the Bottom Up" *Science* 293, 782; and Tseng and Ellenbogen, (2001) "Toward Nanocomputers" *Science* 294, 1293. Nanostructures or nanostructure arrays made according to the present invention optionally can similarly be configured as memory, logic, computing elements, or the like.

Uses of the Methods, Devices and Compositions of the Present Invention

Modifications can be made to the method and materials as described above without departing from the spirit or scope of the invention as claimed, and the invention can be put to a number of different uses, including:

The use of any method herein, to prepare a nanostructure: matrix composition in which the nanostructures are structurally ordered.

The use of a structurally ordered nanostructure composition in the manufacture of a nanostructure-based device.

A kit or system utilizing a use of any one of the structurally ordered nanostructures, nanostructure:matrix compositions, nanostructure:alignment ligand compositions, or methods hereinbefore described. Kits will optionally additionally comprise instructions for preparing the structurally ordered nanostructures, nanostructure:matrix compositions, or nanostructure:alignment ligand compositions of the present invention, instructions for incorporating the compositions into nanostructure-containing devices, or instructions for otherwise performing the methods provided herein, packaging materials, one or more containers which contain nanostructures, matrix components, or alignment ligands, and/or the like.

In an additional aspect, the present invention provides kits embodying the methods and devices herein. Kits of the invention optionally comprise one or more of the following: (1) one or more alignment ligands, or components for the synthesis of the alignment ligands; (2) one or more preparations of nanostructures; (3) components and/or instructions for the preparation of structurally ordered nanostructures in a matrix; (4) components and/or instructions for the preparation of nanostructure:alignment ligand compositions; (5) components and/or instructions for the preparation of clusters of ordered nanostructures; (6) instructions for practicing the methods described herein; and/or (7) packaging materials.

In a further aspect, the present invention provides for the use of any component or kit herein, for the practice of any method or assay herein, and/or for the use of any apparatus or kit to practice any assay or method herein.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A composition comprising a plurality of structurally ordered nanostructures comprising group III-V, group II-VI or group IV semiconductors or alloys, wherein said nanostructures further comprise one or more alignment ligands associated with the nanostructures, and wherein a first alignment ligand on a first member nanostructure cross-links with a second alignment ligand on an adjacent member nanostructure, thereby structurally ordering the plurality of nanostructures in a polymerized matrix.

2. The composition of claim 1, wherein the structurally ordered nanostructures comprise substantially non-randomly oriented nanostructures.

3. The composition of claim 2, wherein the structurally ordered nanostructures comprise substantially aligned nanostructures.

4. The composition of claim 1, wherein the first and second alignment ligands comprise the same molecule.

5. The composition of claim 1, wherein the first and second alignment ligands comprise different molecules.

6. The composition of claim 1, wherein the first and second alignment ligands comprise self-organizing molecules.

7. The composition of claim 1, wherein the first and second alignment ligands comprise complementary binding pairs.

8. The composition of claim 7, wherein the complementary binding pairs comprise two or more molecules having a selected molecular recognition functionality.

9. The composition of claim 8, wherein the first and second alignment ligands comprise an amine-containing moiety or an alcohol-containing moiety, or both.

10. The composition of claim 8, wherein the first and second alignment ligands comprise one or more biomolecule pairs.

11. The composition of claim 10, wherein the biomolecule pair comprises an antibody and an antigen that binds to the antibody; biotin and avidin; a lectin and a carbohydrate ligand; complementary nucleic acids; a protein and a ligand; a receptor and a ligand; an aptamer and an aptamer ligand; or a combination thereof.

12. The composition of claim 1, wherein the first alignment ligand and/or the second alignment ligand comprise two or more selected molecular recognition functionalities per alignment ligand.

13. The composition of claim 1, wherein the nanostructures comprise spherical, ovoid, elongated or branched structures.

14. The composition of claim 13, wherein the nanostructures comprise nanocrystals, nanospheres, nanorods, nanowires, nanotetrapods, dendrimer branching structures, or combinations thereof.

15. The composition of claim 1, wherein the cross-linking between the first and second alignment ligands comprises an ionic interaction, a covalent interaction, a hydrogen bond interaction, an electrostatic interaction, a coulombic interaction, a van der Waals force interaction, or a combination thereof.

16. The composition of claim 1, wherein the first and second alignment ligands comprise one or more functionalized head group capable of binding to a nanostructure surface or to a ligand associated with the nanostructure surface.

17. The composition of claim 16, wherein the functionalized head group comprises one or more phosphonic acid, carboxylic acid, amine, phosphine, phosphine oxide, carbamate, urea, pyridine, isocyanate, amide, nitro, pyrimidine, imidazole, salen, dithiolene, catechol, N,O-chelate ligand, P,N-chelate ligand, or thiol moieties.

18. The composition of claim 16, wherein the chelate N,O ligand comprises ethanol amine or aniline phosphinate.

19. A plurality of clusters of structurally ordered nanostructures dispersed in a matrix on a surface of a substrate, wherein long axes of the nanostructures are aligned substantially parallel to the substrate surface and wherein the matrix comprises alignment ligands cross-linking and orienting the nanostructures.

20. The plurality of nanostructure clusters of claim 19, wherein the structurally ordered nanostructures comprise selectively-oriented nanostructures.

21. The plurality of nanostructure clusters of claim 20, wherein an orientation of the selectively-oriented nanostructures is substantially aligned with a selected axis.

22. The plurality of nanostructure clusters of claim 19, wherein the nanostructures comprise nanorods or nanowires.

* * * * *

UNITED STATES PATENT AND TRADEMARK OFFICE
CERTIFICATE OF CORRECTION

PATENT NO. : 7,662,313 B2  Page 1 of 1
APPLICATION NO. : 10/656911
DATED : February 16, 2010
INVENTOR(S) : Whiteford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Thirtieth Day of November, 2010

David J. Kappos
*Director of the United States Patent and Trademark Office*